US011441459B2

(12) United States Patent
Deibel et al.

(10) Patent No.: US 11,441,459 B2
(45) Date of Patent: *Sep. 13, 2022

(54) COATED WALL-FLOW FILTER (71) Applicant: UMICORE AG & CO. KG, Hanau-Wolfgang (DE)

(72) Inventors: Naina Deibel, Pfungstadt (DE); Martin Foerster, Büdingen (DE); Antje Oltersdorf, Freiburg (DE); Juergen Koch, Hanau (DE); Martin Roesch, Rodgau (DE)

(73) Assignee: UMICORE AG & CO. KG, Hanau-Wolfgang (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/052,592

(22) PCT Filed: May 2, 2019

(86) PCT No.: PCT/EP2019/061232
§ 371 (c)(1),
(2) Date: Nov. 3, 2020

(87) PCT Pub. No.: WO2019/211373
PCT Pub. Date: Nov. 7, 2019

(65) Prior Publication Data
US 2021/0239018 A1 Aug. 5, 2021

(30) Foreign Application Priority Data
May 4, 2018 (DE) .................... 10 2018 110 804.4

(51) Int. Cl.
*F01N 3/035* (2006.01)
*B01D 46/24* (2006.01)
*B01D 53/94* (2006.01)
*C04B 38/00* (2006.01)
*F01N 3/10* (2006.01)
*F01N 3/20* (2006.01)

(52) U.S. Cl.
CPC ......... *F01N 3/035* (2013.01); *B01D 46/2418* (2013.01); *B01D 53/9454* (2013.01); *C04B 38/0006* (2013.01); *C04B 38/0096* (2013.01); *F01N 3/101* (2013.01); *F01N 3/2066* (2013.01); *B01D 2255/9155* (2013.01); *B01D 2279/30* (2013.01); *F01N 2510/06* (2013.01)

(58) Field of Classification Search
CPC ............ C04B 38/0006; C04B 38/0096; C04B 35/195; C04B 2111/00793; C04B 2111/0081; B01D 2255/9155; B01D 2279/30; B01D 46/2418; B01D 53/92; B01D 53/94; B01D 53/9454; F01N 2510/06; F01N 3/021; F01N 3/035; F01N 3/0814; F01N 3/0842; F01N 3/10; F01N 3/101; F01N 3/103; F01N 3/2066; Y02T 10/12

See application file for complete search history.

(56) References Cited

U.S. PATENT DOCUMENTS

| | | | |
|---|---|---|---|
| 4,609,563 A | 9/1986 | Shimrock et al. | |
| 6,478,874 B1 | 11/2002 | Rosynsky et al. | |
| 6,548,105 B2 | 4/2003 | Kiessling et al. | |
| 6,875,725 B2 | 4/2005 | Lindner et al. | |
| 8,277,880 B2 | 10/2012 | Sato et al. | |
| 8,388,721 B2 | 3/2013 | Ishizawa | |
| 8,454,917 B2 | 6/2013 | Hoyer et al. | |
| 8,495,968 B2 | 6/2013 | Tsuji et al. | |
| 8,534,221 B2 | 9/2013 | Tsuji et al. | |
| 8,632,852 B2 | 1/2014 | Tsuji et al. | |
| 8,663,588 B2 | 3/2014 | Lindner et al. | |
| 9,517,462 B2 | 12/2016 | Roesch et al. | |
| 2006/0021339 A1 | 2/2006 | Dong et al. | |
| 2013/0149440 A1* | 6/2013 | Pyzik | C04B 41/009 427/140 |
| 2016/0310935 A1 | 10/2016 | Sutton et al. | |

FOREIGN PATENT DOCUMENTS

| | | |
|---|---|---|
| DE | 42 25 970 C1 | 4/1994 |
| EP | 1 064 094 B1 | 9/2002 |
| EP | 1 181 970 B1 | 2/2004 |
| EP | 1 136 462 B1 | 8/2004 |
| EP | 1 775 022 A1 | 4/2007 |
| EP | 2 388 072 A1 | 11/2011 |
| EP | 2 415 522 A1 | 2/2012 |
| EP | 2 502 661 A2 | 9/2012 |
| EP | 2 521 618 B1 | 8/2013 |

(Continued)

OTHER PUBLICATIONS

International Preliminary Report on Patentability dated Nov. 10, 2020 for International Patent Application No. PCT/EP2019/061232 (9 pages in German with English translation).
Written Opinion dated Jul. 12, 2019 for International Patent Application No. PCT/EP2019/061232 (8 pages in German with English translation).
International Search Report dated Jul. 12, 2019 for International Patent Application No. PCT/EP2019/061232 (3 pages in German with English translation).
Maricq, M.M., et al. Particulate Emissions from a Direct-Injection Spark-Ignition (DISI) Engine. SAE, 1999-01-1530, pp. 1-9.
Mathis, U., et al., TEM analysis of volatile nanoparticles from particle trap equipped diesel and direct-injection spark-ignition vehicles. Atmospheric Environment. vol. 38, pp. 4347-4355.

(Continued)

*Primary Examiner* — Phutthiwat Wongwian
*Assistant Examiner* — Diem T Tran
(74) *Attorney, Agent, or Firm* — Smith, Gambrell & Russell, LLP (57) ABSTRACT The present invention relates to a wall-flow filter, to a method for the production and the use thereof in order to reduce harmful exhaust gases of an internal combustion engine. The wall-flow filter was produced by applying a powder-gas aerosol to the filter, whereby the powder was deposited in the pores of the wall-flow filter.

12 Claims, 3 Drawing Sheets

(56) References Cited

FOREIGN PATENT DOCUMENTS

| | | |
|---|---|---|
| EP | 1 541 220 B1 | 2/2014 |
| EP | 2 727 640 A1 | 5/2014 |
| EP | 2 502 662 B1 | 6/2014 |
| EP | 2 371 451 B1 | 3/2016 |
| EP | 2 371 452 B1 | 3/2016 |
| EP | 1 789 190 B1 | 6/2017 |
| JP | H01-151706 A | 6/1984 |
| JP | 2011-189246 A | 9/2011 |
| JP | 5378659 B2 | 12/2013 |
| JP | 2014-205108 A2 | 10/2014 |
| WO | 99/47260 A1 | 9/1999 |
| WO | 2005/016497 A1 | 2/2005 |
| WO | 2008/000449 A2 | 1/2008 |
| WO | 2008/113445 A1 | 9/2008 |
| WO | 2010/015573 A2 | 2/2010 |
| WO | 2010/097146 A1 | 9/2010 |
| WO | 2011/151711 A1 | 12/2011 |
| WO | 2012/030534 A1 | 3/2012 |
| WO | 2015/049110 A1 | 4/2015 |
| WO | 2015/143191 A1 | 9/2015 |

OTHER PUBLICATIONS

Heck, R. M., et al. Catalytic Air Pollution Control, Commercial Technology, 1995, pp. 86-89.
Hall, D.E., et al. Measurement of the Number and Siz Distribution of Particles Emitted from a Gasoline Direct Injection Vehicle. SAE. 1999-01-3530. pp. 1-11.
Hinds, W. Aerosol Technology: Properties and Behavior and Measurement of Airborne Particles. Wiley, Second Edition, 1999. 200 Pages.
Stieβ, M. Mechanical Process Engineering—Particle Technology 1, Springer, 3rd edition 2009. Kapitel 2. Kennzeichnungen von Partikeln und dispersen Stoffsystemen [Chapter 2 Identification of particles and disperse Substance systems] pp. 9-95 in German with machine Translation.
ISO 11465—Soil Quality—Determination fo dry matter and water content on a mass basis—Gravimetric Method. 1993 (8 pages).
ISO 13320: 2009(E). Particle size analysis—Laser diffraction Methods (60 pages).
DIN 66133. Jun. 1993, Bestimmung der Porenvolumenverteilung und der spezifischen Oberfläche von Feststoffen durch Quecksilberintrusionv. [Determination of the pore volume distribution and the specific surface area of solids by mercury intrusion] (3 pages in German with machine translation).
DIN 66134. Feb. 1998, Bestimmung der Porengrößenverteilung und der spezifischen Oberfläche mesoporöser Feststoffe durch Stickstoffsorption Verfahren nach Barrett, Joyner und Halenda (BJH) [Determination of the pore size distribution and the specific surface mesoporous solids by nitrogen sorption Procedure according to Barrett, Joyner and Halenda (BJH)] (7 pages in German with machine translation).
Wikipedia. Color difference. Accessed May 9, 2018. https://en.wikipedia.org/wiki/Color_difference (6 Pages).
http://www.tsi.com/Aerosolgeneratoren-und-dispergierer/ accessed May 7, 2018 (3 pages).
https://www.palas.de/de/product/aerosolgeneratorssolidparticles accessed May 7, 2018 (2 pages).

* cited by examiner

COATED WALL-FLOW FILTER

The present invention relates to a wall-flow filter, to a method for the production and the use thereof in order to reduce harmful exhaust gases of an internal combustion engine. The wall-flow filter was produced by applying a powder-gas aerosol to the filter, whereby the powder was deposited in the pores of the wall-flow filter.

The exhaust gas of internal combustion engines in motor vehicles typically contains the harmful gases carbon monoxide (CO) and hydrocarbons (HC), nitrogen oxides ($NO_x$), and possibly sulfur oxides ($SO_x$), as well as particulates that mostly consist of solid carbon-containing particles and possibly adherent organic agglomerates. These are called primary emissions. CO, HC, and particulates are the products of the incomplete combustion of the fuel inside the combustion chamber of the engine. Nitrogen oxides form in the cylinder from nitrogen and oxygen in the intake air when combustion temperatures exceed 1200° C. Sulfur oxides result from the combustion of organic sulfur compounds, small amounts of which are always present in non-synthetic fuels. Compliance in the future with statutory exhaust emission limits for motor vehicles applicable in Europe, China, North America, and India requires the extensive removal of said harmful substances from the exhaust gas. For the removal of these emissions, which are harmful to health and environment, from the exhaust gases of motor vehicles, a variety of catalytic technologies for the purification of exhaust gases have been developed, the fundamental principle of which is usually based upon guiding the exhaust gas that needs purification over a flow-through or wall-flow honeycomb body with a catalytically active coating applied thereto. The catalytic converter facilitates the chemical reaction of different exhaust gas components, while forming non-hazardous products, such as carbon dioxide, water, and nitrogen.

The flow-through or wall-flow honeycomb bodies just described are also called catalyst supports, carriers, or substrate monoliths, as they carry the catalytically active coating on their surface or in the walls forming this surface. The catalytically active coating is often applied to the catalyst support in the form of a suspension in a so-called coating operation. Many such processes have been published in the past by automotive exhaust-gas catalytic converter manufacturers (EP1064094B1, EP2521618B1, WO10015573A2, EP1136462B1, U.S. Pat. No. 6,478,874B1, U.S. Pat. No. 4,609,563A, WO9947260A1, JP5378659B2, EP2415522A1, JP2014205108A2).

The operating mode of the internal combustion engine is decisive for the methods of harmful substance conversion in the catalytic converter that are possible in each case. Diesel engines are usually operated with excess air, most spark-ignition engines with a stoichiometric mixture of intake air and fuel. Stoichiometric means that on average exactly as much air is available for combustion of the fuel present in the cylinder as is required for complete combustion. The combustion air ratio λ (A/F ratio; air/fuel ratio) sets the air mass $m_{L,actual}$ which is actually available for combustion in relation to the stoichiometric air mass $m_{L,st}$:

$$\lambda = \frac{m_{L,actual}}{m_{L,st}}$$

If λ<1 (e.g., 0.9), this means "air deficiency" and one speaks of a rich exhaust gas mixture; λ>1 (e.g., 1.1) means "excess air" and the exhaust gas mixture is referred to as lean. The statement λ=1.1 means that 10% more air is present than would be required for the stoichiometric reaction.

When lean-burn motor vehicle engines are mentioned in the present text, reference is thereby made mainly to diesel engines and to predominantly on average lean-burn spark-ignition engines. The latter are gasoline engines predominantly operating on average with a lean A/F ratio (air/fuel ratio). In contrast, most gasoline engines are operated with an on average stoichiometric combustion mixture. In this respect, the expression "on average" takes into consideration the fact that modern gasoline engines are not statically operated with a fixed air/fuel ratio (A/F ratio; λ value). It is rather the case that a mixture with a discontinuous course of the air ratio λ around λ=1.0 is prespecified by the engine control system, resulting in a periodic switching of oxidizing and reducing exhaust gas conditions. This change in the air ratio λ is significant for the exhaust gas purification result. To this end, the λ value of the exhaust gas is regulated with a very short cycle time (approx. 0.5 to 5 Hz) and an amplitude Δλ of 0.005≤Δλ≤0.07 around the value λ=1.0. On average, the exhaust gas under such operating states should therefore be described as "on average" stoichiometric. In order to ensure that these deviations do not adversely affect the result of exhaust gas purification when the exhaust gas flows over the three-way catalytic converter, the oxygen-storing materials contained in the three-way catalytic converter balance out these deviations by absorbing oxygen from the exhaust gas or releasing it into the exhaust gas as needed (R. Heck et al., Catalytic Air Pollution Control, Commercial Technology, Wiley, 2nd edition 2002, p. 87). However, due to the dynamic mode of operation of the engine in the vehicle, further deviations from this state also occur at times. For example, under extreme acceleration or while coasting, the operating states of the engine, and thus of the exhaust gas, can be adjusted and can, on average, be hypostoichiometric or hyperstoichiometric. However, lean-burn spark-ignition engines have an exhaust gas which is predominantly, i.e., for the majority of the duration of the combustion operation, combusted with an air/fuel ratio that is lean on average.

The harmful gases carbon monoxide and hydrocarbons from a lean exhaust gas can easily be rendered harmless by oxidation on a suitable oxidation catalyst. In a stoichiometrically operated internal combustion engine, all three harmful gases (HC, CO, and NOx) can be eliminated via a three-way catalytic converter.

The reduction of nitrogen oxides to nitrogen ("denitrification" of the exhaust gas) is more difficult on account of the high oxygen content of a lean-burn engine. A known method is selective catalytic reduction (SCR) of the nitrogen oxides in a suitable catalytic converter or SCR catalytic converter for short. This method is currently preferred for the denitrification of lean-engine exhaust gases. The nitrogen oxides contained in the exhaust gas are reduced in the SCR method with the aid of a reducing agent metered into the exhaust system from an external source. Ammonia is used as the reducing agent, which converts into nitrogen and water the nitrogen oxides present in the exhaust gas at the SCR catalytic converter. The ammonia used as reducing agent may be made available by metering an ammonia precursor compound, for example urea, ammonium carbamate, or ammonium formate, into the exhaust system, and by subsequent hydrolysis.

Diesel particulate filters or gasoline particulate filters with and without additional catalytically active coating are suitable aggregates for removing the particulate emissions. In order to meet the legal standards, it is desirable for current and future applications for the exhaust gas aftertreatment of internal combustion engines to combine particulate filters with other catalytically active functionalities not only for reasons of cost but also for installation space reasons. The use of a particulate filter, whether catalytically coated or not, leads to a noticeable increase in the exhaust-gas back pressure in comparison with a flow-through support of the same dimensions and thus to a reduction in the torque of the engine or possibly to increased fuel consumption. In order to not increase the exhaust-gas back pressure even further, the amounts of oxidic support materials for the catalytically active noble metals of the catalytic converter or oxidic catalyst materials are generally applied in smaller quantities in the case of a filter than in the case of a flow-through support. As a result, the catalytic effectiveness of a catalytically coated particulate filter is frequently inferior to that of a flow-through monolith of the same dimensions.

There have already been some efforts to provide particulate filters which have good catalytic activity due to an active coating and yet have the lowest possible exhaust-gas back pressure. On the one hand, it has proven to be advantageous if the catalytically active coating is not present as a layer on the wall of a porous wall-flow filter, but instead the wall of the filter is to be interspersed with the catalytically active material (WO2005016497A1, JPH01-151706, EP1789190B1). For this purpose, the particle size of the catalytic coating is selected such that the particles penetrate into the pores of the wall-flow filters and can be fixed there by calcination.

A further functionality of the filter, which can be improved by a coating, is its filtration efficiency, i.e., the filtering effect itself. WO 2011151711A1 describes a method by which a dry aerosol is applied to an uncoated or catalytically coated filter. The aerosol is provided by the distribution of a powdered high-melting metal oxide having a particle size of 0.2 µm to 5 µm and guided through the inlet side of a wall-flow filter by means of a gas stream. In this case, the individual particles agglomerate to form a bridged network of particles and are deposited as a layer on the surface of the individual inlet channels passing through the wall-flow filter. The typical powder loading of a filter is between 5 g and 50 g per liter of filter volume. It is expressly pointed out that it is not desirable to end up with a coating inside the pores of the wall-flow filter with the metal oxide.

A further method for increasing the filtration efficiency of catalytically inactive filters is described in WO2012030534A1. In this case, a filtration layer ("discriminating layer") is created on the walls of the flow channels of the inlet side by the deposition of ceramic particles via a particle aerosol. The layers consist of oxides of zirconium, aluminum, or silicon, preferably in fiber form ranging from 1 nm to 5 µm, and have a layer thickness greater than 10 µm, typically 25 µm to 75 µm. After the coating process, the applied powder particles are calcined in a thermal process.

A further method in which a membrane ("trapping layer") is produced on the surfaces of the inlet channels of filters in order to increase the filtration efficiency of catalytically inactive wall-flow filters is described in patent specification U.S. Pat. No. 8,277,880B2. The filtration membrane on the surfaces of the inlet channels is produced by sucking through a gas stream loaded with ceramic particles (for example, silicon carbide, cordierite). After application of the filter layer, the honeycomb body is fired at temperatures greater than 1000° C. in order to increase the adhesive strength of the powder layer on the channel walls. EP2502661A2 and EP2502662B1 mention further on-wall coatings by powder application.

A coating inside the pores of a wall-flow filter unit by spraying dry particles is described in U.S. Pat. No. 8,388,721B2. In this case, however, the powder should penetrate deeply into the pores. 20% to 60% of the surface of the wall should remain accessible to soot particles, thus open. Depending on the flow rate of the powder/gas mixture, a more or less steep powder gradient between the inlet and outlet sides can be set.

The introduction of the powder into the pores, e.g. by means of an aerosol generator, is also described in EP2727640A1. Here, a non-catalytically coated wall-flow filter is coated using a gas stream containing, for example, aluminum oxide particles in such a way that the complete particles, which have a particle size of 0.1 µm to 5 µm, are deposited as a porous filling in the pores of the wall-flow filter. The particles themselves can realize a further functionality of the filter in addition to the filtering effect. For example, these particles are deposited in the pores of the filter in an amount greater than 80 g/l based on the filter volume. Here, they fill 10% to 50% of the volume of the filled pores in the channel walls. This filter, both loaded with soot and without soot, has an improved filtration efficiency compared to the untreated filter together with a low exhaust-gas back pressure of the soot-loaded filter. Nevertheless, there continues to be a need for particulate filters in which the filtration efficiency is optimized with respect to the exhaust-gas back pressure.

The object of the present invention is therefore to specify a corresponding particulate filter in which an adequate filtration efficiency is coupled with the lowest possible increase in the exhaust-gas back pressure.

These and other objects which are obvious from the prior art are achieved by the specification of a particulate filter according to Claims 1 to 8. Claims 9 to 10 are directed at the production of a particulate filter according to the invention. Claims 11 and 12 aim at using the particulate filter for the exhaust-gas aftertreatment of internal combustion engines.

Figure 1:
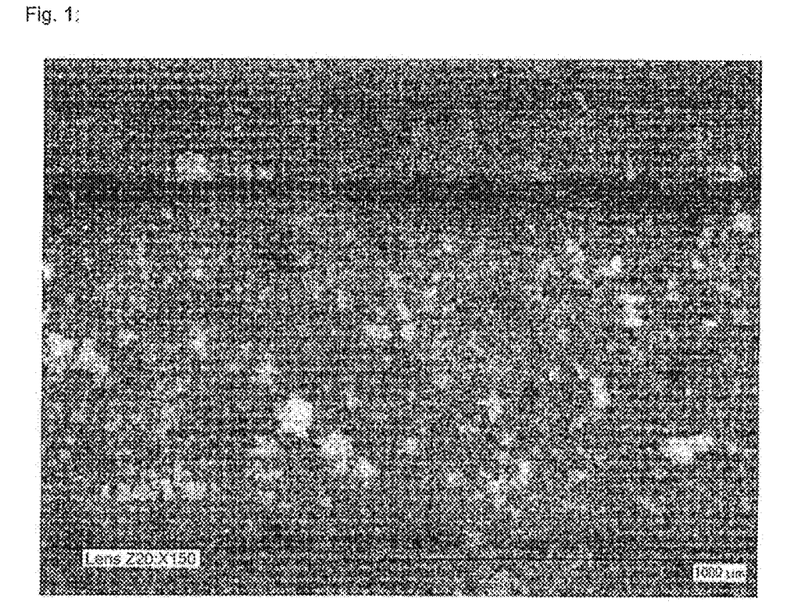
FIG. 1: Image of a wall of a wall-flow filter powder-sprayed according to the invention
Figure 2:
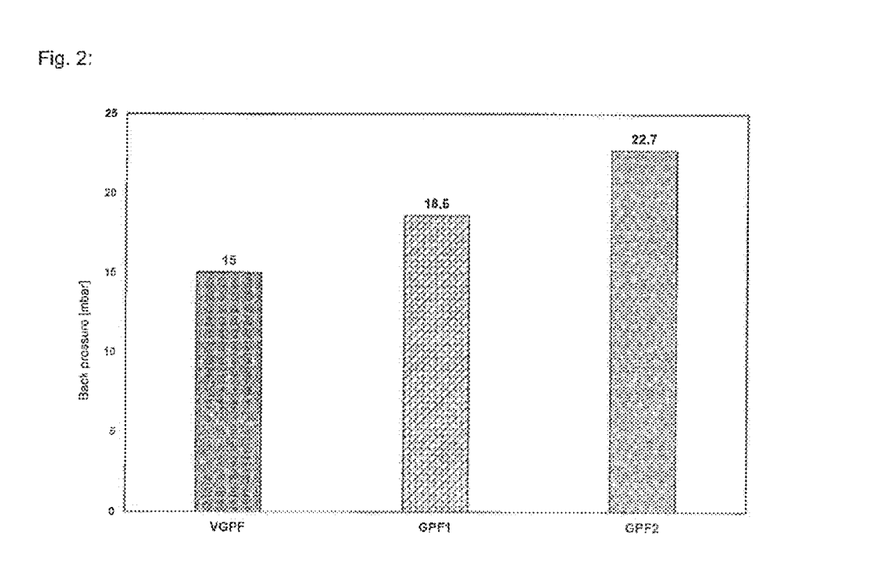
FIG. 2: Increase in exhaust-gas back pressure as a result of the powder-spraying
Figure 3:
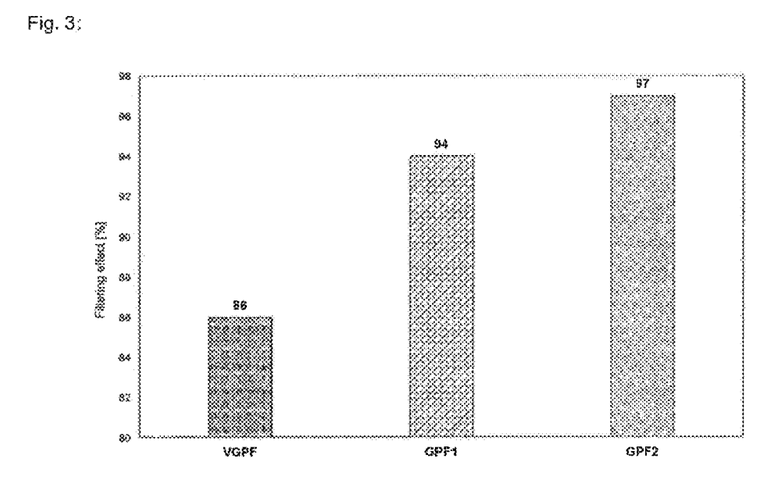
FIG. 3: Increase in filtration efficiency as a result of the powder-spraying according to the invention

By providing a possibly catalytically active wall-flow filter for the reduction of harmful substances in the exhaust gas of an internal combustion engine, wherein a dry, non-catalytically coated filter is selectively impinged on its input surface with a dry powder-gas aerosol, which has at least a high-melting compound, in such a way that the powder is deposited in the pores of the filter walls and fills them up to the input surface but does not form a contiguous layer on the walls of the filter in the process, and the amount of powder remaining in the filter is below 50 g/l and the powder coating has an increasing concentration gradient over the length of the filter from the inlet side to the outlet side, one arrives at an exceedingly successful solution to the object posed. It is assumed that the dry spraying of sufficiently small powder particles in the dry state will result in the particles not agglomerating. The impingement of the dry, non-catalytically coated filter with the dry powder-gas aerosol results in the powder particles being deposited in the pores of the filter following the flow of the gas (FIG. 1). An outstanding filtration efficiency of the filter together with a sufficiently low exhaust-gas back pressure is thereby achieved (FIGS. 2 and 3). The filters described herein, which are impinged with powder, differ from those that are produced in the exhaust system of a vehicle by ash deposition during operation. According to the invention, the filters are deliberately sprayed with a specific, dry powder. As a result, the balance between filtration efficiency and exhaust-gas back pressure can be adjusted selectively right from the start. Wall-flow filters in which undefined ash deposits have resulted from combustion in the cylinder during driving operation are therefore not included in the present invention.

Dry in the sense of the present invention accordingly means exclusion of the application of a liquid, in particular of water. In particular, the production of a suspension of the powder in a liquid for spraying into a gas stream should be avoided. A certain moisture content may possibly be tolerable both for the filter and for the powder, provided that achieving the objective—the completest possible deposition of the powder in the pores—is not negatively affected. As a rule, the powder is free-flowing and sprayable by energy input. The moisture content of the powder or of the filter at the time of application of the powder should be less than 20%, preferably less than 10%, and very particularly preferably less than 5% (measured at 20° C. and normal pressure, ISO 11465, latest version on the date of application).

All ceramic materials customary in the prior art can be used as wall-flow monoliths or wall-flow filters. Porous wall-flow filter substrates made of cordierite, silicon carbide, or aluminum titanate are preferably used. These wall-flow filter substrates have inlet and outlet channels, wherein the respective downstream ends of the inlet channels and the upstream ends of the outlet channels are offset against each other and closed off with gas-tight "plugs." In this case, the exhaust gas that is to be purified and that flows through the filter substrate is forced to pass through the porous wall between the inlet channel and outlet channel, which delivers an excellent particulate filtering effect. The filtration property for particulates can be designed by means of porosity, pore/radii distribution, and thickness of the wall. The porosity of the uncoated wall-flow filters is typically more than 40%, generally from 40% to 75%, particularly from 50% to 70% [measured according to DIN 66133, latest version on the date of application]. The average pore size of the uncoated filters is at least 7 µm, for example from 7 µm to 34 µm, preferably more than 10 µm, in particular more preferably from 10 µm to 25 µm, or very preferably from 15 µm to 20 µm [measured according to DIN 66134, latest version on the date of application]. The completed filters with a pore size of typically 10 µm to 20 µm and a porosity of 50% to 65% are particularly preferred.

The aerosol consisting of the gas and the powder may be prepared in accordance with the requirements of the person skilled in the art. For this purpose, a powder is usually mixed with a gas (http://www.tsi.com/Aerosolaeneratoren-und-disperaierer/; https:/www.palas.de/de/product/aerosolgeneratorssolidparticles). This mixture of gas and powder produced in this way is then advantageously fed into the inlet side of the wall-flow filter via a gas stream. The term "inlet side" refers to the part of the filter formed by the inflow channels/input channels. The same applies mutatis mutandis to the outlet side. The input surface is formed by the wall surfaces of the inflow channels/input channels on the input side of the wall-flow filter.

All gases considered by the person skilled in the art for the present purpose can be used as gases for producing the aerosol and for inputting into the filter. The use of air is most particularly preferred. However, it is also possible to use other reaction gases which can develop either an oxidizing or a reducing activity with respect to the powder used. With certain powders, the use of noble gases may also prove advantageous. Mixtures of the listed gases are also conceivable.

Figure 4:
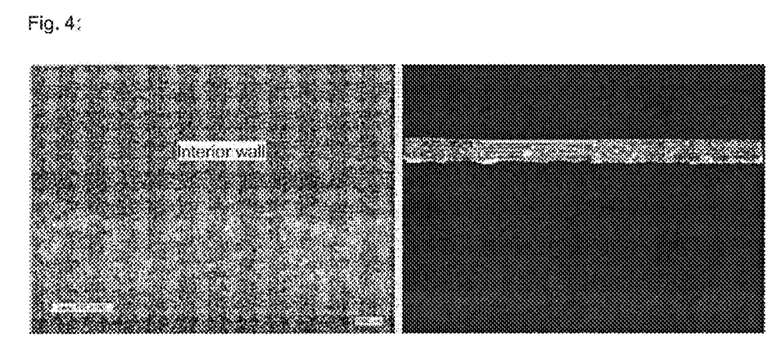
FIG. 4: Section through a powder-sprayed wall of a wall-flow filter and graphical analysis of the points of powder-spraying

The filter according to the invention has an increasing gradient with regard to the concentration of the powder in the longitudinal direction of the filter from the inlet to the outlet side. This can be set and also varied using selected parameters. According to the invention, the term "increasing gradient" refers to the fact that the gradient of powder concentration in the filter increases in the axial direction, from the inlet side to the outlet side, possibly from negative values to more positive values. In a preferred embodiment, there is more powder in the vicinity of the output plugs of the inlet channel and significantly less powder at the input of the filter. In order to describe the gradient, the filter is divided into three successive sections of equal length along its longitudinal axis. In a preferred form, the filter is coated with powder in an area near the inlet side and in an area in the middle of the filter at less than 40% of the wall surface of the input channel, while in an area near the outlet side, more than 40% of the wall surface of the input channel are coated with powder, wherein in a particularly preferred form, between 5% and 35% of the wall surface of the input channel are coated with powder in an area near the inlet side, between 8% and 38% in an area in the middle of the filter, and between 40% and 60% in an area near the outlet side, and in a very particularly preferred form, between 5% and 25% of the wall surface of the input channel are coated with powder in an area near the inlet side, between 8% and 30% in an area in the middle of the filter, and between 45% and 60% in an area near the outlet side. The degree of coating of the wall surface was determined by means of image analysis of light microscopy images (FIG. 4). Corresponding images of the inlet and outlet channels were taken in the process. In this type of analysis, the average color of the wall surface of the non-powder-coated outlet channel is determined as a reference. This reference value is subtracted from the corresponding image of the powder-coated areas in the inlet channel, wherein the color difference was defined according to CIE76 of the International Commission on Illumination with a lowest still distinguishable color difference of 2.33 (https://en.wikipedia.org/wiki/Color_difference#CIE76).

The gradient resulting from the powder coating is advantageous for a further increased filtration efficiency. In this case, the powder in particular fills in the large pores of the filter substrate. Here, it is important that no "powder membrane," that is to say, no complete or continuous powder layer (see definition below), forms on the filter wall in this process. In a likewise advantageous embodiment, the concentration gradient can be designed, for example, by varying the spraying rate such that more powder is deposited on the filter at the inlet side than in the middle of the filter, and at the outlet side (at the other end of the filter) more than at the inlet side. In another embodiment, the concentration gradient can be designed, for example, by varying the spraying rate such that more powder is deposited on the filter at the inlet side than in the middle of the filter and at the outlet side. Simulation results of the gas flow in a filter show that the fine particles are carried into the pores with the gas stream. According to the simulation results, the last third of the substrate is mainly responsible (more than 50%) for the filtration property of the entire filter. An increased application of a powder coating on the last third of the filter additionally increases the back pressure there, this being due to the lower permeability, and the throughflow shifts more into the first two thirds of the filter. The powder-coated filter should therefore have a more rapidly increasing gradient of the coating from the input to the output in order to increase Its filtration effect. This applies mutatis mutandis to setting an advantageous exhaust-gas back pressure. Accordingly, if necessary, a gradient of the concentration of the powder that increases less rapidly should be set here.

Figure 5:
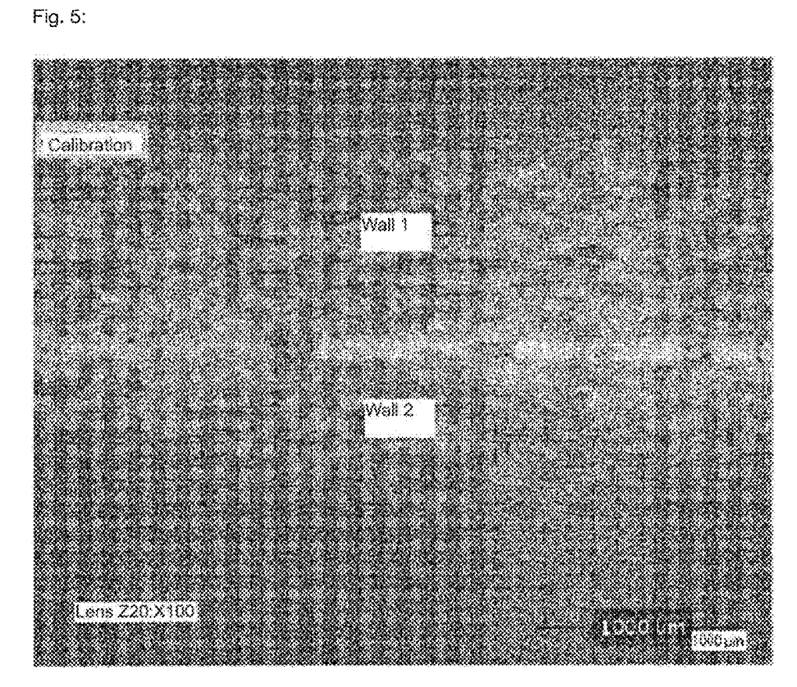
FIG. 5: Powder-spraying result in the corner of a filter wall

Furthermore, a preferred development of the powder coating is characterized in that when filter substrates with square channels are used, the powder coating in the corners of the channels is thicker than in the corresponding center of the input surface (FIG. 5). With exhaust-gas back pressure not increasing excessively, this has a further improved effect on filtration efficiency. The term "the corresponding center" refers to the place in the center of the input channel between the corners of the channels, which has the same distance to the inlet end in the axial direction as the corresponding place in the corners of the channels.

Powders which are preferably used in the present invention for producing the aerosol are sufficiently familiar to the person skilled in the art. These are generally high-melting metal compounds, which are commonly used as support materials for catalysts in the automotive exhaust-gas field. Corresponding metal oxide, metal sulfate, metal phosphate, metal carbonate, or metal hydroxide powders or their mixtures are preferably used. Possible metals for the metal compounds are in particular those selected from the group of alkali metals, alkaline earth metals or earth metals, or transition metals. Such metals selected from the group of calcium, magnesium, strontium, barium, aluminum, silicon, titanium, zirconium, cerium are preferably used. As stated, these metals can preferably be used as oxides. Very particular preference is given to the use of cerium oxide, titanium dioxide, zirconium dioxide, silicon dioxide, aluminum oxide, or mixtures or mixed oxides thereof. Very particular preference is given to the use of an aerosol which is a mixture of air and one of these metal oxide powders. Here, the term "mixed oxide" (solid solutions of a metal oxide in at least one other) is also understood to mean the use of zeolites and zeotypes. In the context of the invention, zeolites and zeotypes are defined as in WO2015049110A1.

In order that the powder of the powder-gas aerosol can deposit sufficiently well in the pores of the catalytically coated wall-flow filter, the particle diameter in the aerosol should be at least smaller than the pores of the wall-flow filter. This can be expressed by the ratio of the average particle diameter d50 (measured with the Tornado dry dispersion module by the company Beckmann according to the most recent ISO 13320-1 on the date of application) in the dry aerosol and the average pore diameter of the wall-flow filter (measured according to DIN 66134, latest version on the date of application) being between 0.03 and 2, preferably between 0.05 and 1.43, and very particularly preferably between 0.05 and 0.63. This ensures that the particles of the powder following the gas stream are able to deposit in the pores of the walls of the wall-flow filter and consequently do not form a contiguous layer on the wall.

It is readily apparent to the person skilled in the art that a certain amount of powder must not be exceeded if the particles of the powder are to be deposited exclusively in the pores of the walls of the wall-flow filter. Otherwise, the pores would fill up according to the invention and all further material would then only be able to deposit on the channel walls of the wall-flow filter. For this reason, depending on the porosity and pore size of the wall-flow filter, the upper limit of the loading of the wall-flow filter with the powder is therefore a value at which the gas-permeable pores in the input surface are filled up with the powder and no complete or continuous, contiguous powder layer has as yet been deposited on the input surfaces. Particularly preferably, the gas-permeable pores are filled with powder only up to their surface at the input surface. As a rule, the loading of the filter with the powder is less than 50 g/l, preferably no more than 20 g/l, based on the filter volume. The value is more preferably no more than 15 g/l, very particularly preferably no more than 10 g/l. A lower limit is naturally formed by the desired increase in filtration efficiency. Preferably >0.5 g/l and very preferably >1 g/l should be mentioned here.

For a better deposition of the soot particles, an adequate flowed-around surface is advantageous (see below). Preferably, the entire outer surface of the powder in the pores of the filter walls should be greater than 5 $m^2$ per liter, preferably greater than 10 $m^2$, and most preferably greater than 15 $m^2$ based on the outer filter volume in liters.

The total surface area of the particles SV is obtained from the particle size x according to:

$$S_V[m^{-1}] = 6 \cdot \int_{x\_min}^{x\_max} x_i^{-1} \cdot q_0(x_i) \cdot dx = 6 \cdot \sum_{min}^{max} \frac{\Delta Q_3(x_i)}{x_i}$$

(M. Stieß, Mechanical Process Engineering—Particle Technology 1, Springer, 3rd edition 2009, page 35), and the mass-related surface (M. Stieß, Mechanical Process Technology—Particle Technology 1, Springer, 3rd edition 2009, page 16) is obtained from the density of the particles p:

$$S_m\left[\frac{m^2}{\text{kg}}\right] = \frac{S_V}{p_{particles}}$$

outer surface of the powder $S_{outer}[m^2]=S_m \cdot m_{powder}$

A loose crosslinking of the powder is advantageous for a low pressure loss and at the same time for good adhesion in the pores of the substrate. This is achieved by powder with a defined particle size distribution. For the large pores, a proportion of larger particles must be present. The powder used here should have a broad, ideally an at least bimodal particle size distribution. The loose crosslinking of the powder in the pores of the substrate can be advantageously achieved in particular by powder with a multimodal or broad q3 particle size distribution. This multimodal particle distribution can be generated by, for example, mixing powders with different d50 values.

For the definition of the particle size distribution of the powder, a distinction is made, depending on the method by which the quantity of particles is determined, among other things between number-related (q0) and volume-related (q3) particle size distributions (M. Stieß, Mechanical Process Technology—Particle Technology 1, Springer, 3rd edition 2009, page 29).

Here, the size of the coarse particles (defined by the d90 value of the q3 particle size distribution, measured with the Tornado dry dispersion module of the company Beckmann according to the most recent ISO 13320-1 on the date of application), of the powder used should be less than or equal to 60% of the average volume-related q3 pore size (d50) of the filter used (measured according to DIN 66134, latest version on the date of application), preferably less than 50%. The average q3 particle size of the powder (d50) should be 5% to 30% of the average q3 pore size (d50) of the filter used, preferably 7% to 25%, and very preferably 10% to 25%. The d10 value of the q3 particle size distribution of the powder, which describes the fine fraction of the powder, should be 20% to 60% of the average q3 particle size (d50) of the powder, preferably 25% to 50%, and particularly preferably 25% to 40%. The d10 value of the number-related q0 particle size distribution should generally be higher than 0.05 μm, preferably higher than 0.08 μm, and particularly preferably higher than 0.1 μm.

Figure 6:
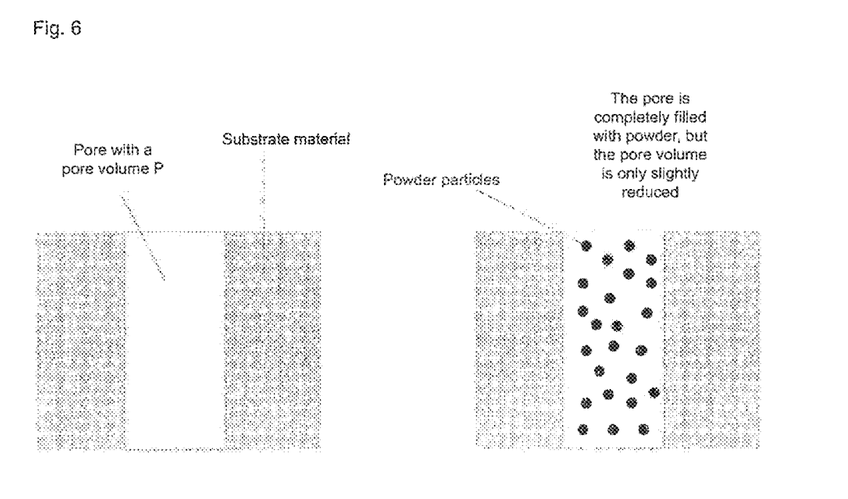
FIG. 6: Schematic drawing of the filling of a pore with particles

Another feature of an advantageous filter according to the invention is that the embedded powder particles should be located mainly in the large and thus flowed-through pores of the filter. In order to minimize the increase in back pressure after powder-spraying, the powder volume corresponding to the summation of all individual particle volumes must not be excessive. In order to determine a suitable range for the powder volume and thus the appropriate amount of powder, regardless of the powder material, the powder volume is calculated from powder mass and porosity. From this, it follows that advantageously a maximum of 10%, preferably between 1% and 5%, and particularly preferably between 1.5% and 3%, of the total pore volume of the filter substrate should be filled with particles. The filled pore volume in % corresponds to the ratio of the sum of the volume of all powder particles and the pore volume of the filter to be coated (see also FIG. 6).

Furthermore, a preferred development of the powder coating is characterized in that 5% to 35%, particularly preferably 5% to 25%, very particularly preferably 8% to 15%, of the total pore volume of the porous filter wall between inlet and outlet channels is filled with a loosely deposited powder. The degree of coating of the pore volume of the porous filter walls was determined by means of image analysis of light microscopy images ("wall interior" area in FIG. 4). Corresponding images of the inlet and outlet channels were taken in the process. In this type of analysis, the average color of the wall surface of the non-powder-coated outlet channel is determined as a reference. This reference value is subtracted from the corresponding image of the powder-coated areas in the wall, wherein the color difference was defined according to CIE76 of the International Commission on Illumination with a lowest still distinguishable color difference of 2.33 (https://en.wikipedia.org/wiki/Color_difference#CIE76).

According to the invention, the powder can be used as such as described above. However, the use of dry powder which supports a catalytic activity with regard to exhaust-gas aftertreatment is also conceivable. Accordingly, the powder itself can likewise be catalytically active with regard to reducing harmful substances in the exhaust gas of an internal combustion engine. Suitable for this purpose are all activities known to the person skilled in the art, such as TWC, DOC, SCR, LNT, or soot-burn-off-accelerating catalysts. In this respect, it may be possible to use aluminum oxide, for example, impregnated with a noble metal for the production of the powder-gas aerosol.

The wall-flow filter produced according to the invention exhibits an excellent filtration efficiency with only a moderate increase in exhaust-gas back pressure as compared to a wall-flow filter in the fresh state that has not been impinged by powder. The wall-flow filter according to the invention preferably exhibits an increase in filtration efficiency of at least 5% absolute, preferably at least 20% absolute, and very particularly preferably at least 40% absolute at a relative increase in the exhaust-gas back pressure of the fresh wall-flow filter of at most 40%, preferably at most 20%, and very particularly preferably at most 10%, as compared to a fresh filter not treated with powder. Particularly advantageous is an improvement in filtration efficiency of at least 20% with a maximum back pressure increase of no more than 40%. As stated, the powder deposits exclusively only into the open pores of the filter and forms a porous matrix. The slight increase in back pressure is probably due to the fact that the cross-section of the channels on the input side is not significantly reduced by the application, according to the invention, of a powder to the filter. It is assumed that the powder in itself forms a porous structure, which is believed to have a positive effect on the back pressure. For this reason, a filter according to the invention should also exhibit better exhaust-gas back pressure than those of the prior art in which a powder was deposited on the walls of the inlet side of a filter.

The present invention also provides a method for producing a wall-flow filter according to the invention. In principle, the person skilled in the art knows how to produce an aerosol from a powder and a gas in order to then guide the aerosol through the filter which is to be impinged by the powder. According to the invention, a carrier gas is charged with a powder and sucked into a filter. This ensures that the powder can be distributed sufficiently well for it to be able to penetrate into the inlet channels of the filter on the inlet side of the wall-flow filter.

In this case, the powder is deposited exclusively in the accessible pores of the filter walls without forming a complete or continuous layer on the filter wall in the inlet channels. As described above, a concentration gradient of the powder over the axial length of the carrier can advantageously be adjusted, for example, by using different flow breakers in the aerosol gas stream upstream of the inlet side of the carrier and also by adjusting the coating parameters, such as the flow velocity of the carrier gas and atomizer gas. Even the physical parameters of the powder used, such as the bulk density, residual moisture content, and particle size distribution, can be used in a targeted manner to create the desired gradient described above. Addition may be continuous until the sufficient amount of powder is deposited in the filter. A pulsed addition is also possible such that the powder charged with compressed gas is metered periodically into the gas stream sucked through the filter until the sufficient amount of powder has been deposited in the filter. The powder can be injected not only continuously or in a pulsating manner into a gas stream flowing permanently through the filter but can also be sprayed beforehand into a separate buffer chamber. After the powder has been sprayed, a flap opens to a chamber in which the substrate is clamped. The gas/powder mixture can then be introduced from the buffer chamber into the substrate by a suction pulse. Depending on the amount of powder to be introduced into the substrate, this process can be repeated as often as desired. Apparatuses and methods in which such a metering of a powder is described are appreciated in the prior art (DE4225970C1, U.S. Pat. Nos. 8,495,968B2, 8,632,852B2, 8,534,221B2, 8,277,880B2; see also above).

In order to be able to draw the powder sufficiently deeply into the pores on the surface of the filter wall on the inlet side of the filter, a certain suction power (if the powder is sucked through the filter) or a pressure power (if the powder is pressed through the filter) or optionally both are needed. In orientation experiments for the respective filter and the respective powder, the person skilled in the art can form an idea for himself in this respect. It has been found that the aerosol (powder/gas mixture) is preferably sucked and/or pressed through the filter at a rate of 5 m/s to 50 m/s, more preferably 10 m/s to 40 m/s, and very particularly preferably 15 m/s to 35 m/s. This likewise achieves an advantageous adhesion of the applied powder.

As already described, the powder is converted into an aerosol. This can be done according to the requirements of the person skilled in the art (EP2371451B1; EP2371452B1; EP2388072A1). A gas stream then carries the finely distributed powder into the inlet side of the wall-flow filter. Here, the powder is then deposited exclusively in the pores of the channel walls. This is essentially achieved by the powder being dry in the sense of the invention during the impingement of the wall-flow filter. The powder is optionally mixed with the ambient air and applied to the filter. Without being bound by any particular theory, it is assumed that this manner of application of the powder counteracts caking or agglomeration of the individual powder constituents. This preserves the original particle size of the powder particles in the aerosol. In this way, it is then possible to deposit the powder particles in the wall pores of the wall-flow filter and not, as described in the prior art, onto the pores and onto the walls of the inlet channels.

The present invention also relates to the use of a wall-flow filter according to the invention for reducing harmful exhaust gases of an internal combustion engine. In principle, all catalytic exhaust-gas aftertreatments (see above) coming into consideration for this purpose to the person skilled in the art and having a filter can serve for application purposes, but in particular those in which the filter is in an exhaust system together with one or more catalytically active aggregates selected from the group consisting of nitrogen oxide storage catalysts, SCR catalysts, three-way catalysts, and diesel oxidation catalysts. The filter according to the invention is particularly advantageously used in combination with a three-way catalyst, in particular on its downstream side. It is particularly advantageous if the filter itself is a three-way catalytically active filter. The filters produced by the method according to the invention, optionally coated with catalytically active powder, are suitable for all these applications. The use of the filters according to the invention for the treatment of exhaust gases of a stoichiometrically operated internal combustion engine Is preferred.

Wall-flow filters with a catalytic activity that eliminates nitrogen oxides and hydrocarbons and carbon monoxide (HC, CO, and $NO_x$) in the stoichiometric exhaust gas ($\lambda=1$ conditions) are usually referred to as catalyzed gasoline particulate filters (cGPF). In addition, they can convert the oxides of the nitrogen under rich exhaust gas conditions and CO and HC under lean conditions. The powders used here can accordingly be designed to be catalytically active. They for the most part contain platinum group metals, such as Pt, Pd, and Rh, as catalytically active components, wherein Pd and Rh are particularly preferred. The catalytically active metals are often deposited with high dispersion on large-surface oxides of aluminum, zirconium, and titanium, or mixtures thereof, which may be stabilized by additional transition elements, such as lanthanum, yttrium, praseodymium, etc. Such three-way catalysts also contain oxygen-storing materials (for example, Ce/Zr mixed oxides; see below). For example, a suitable three-way catalytic coating is described in EP1181970B1, EP1541220B1, WO2008113445A1, WO2008000449A2, to which reference is hereby made with regard to the use of catalytically active powders.

The requirements applicable to gasoline particulate filters differ significantly from the requirements applicable to diesel particulate filters (DPF). Diesel engines without DPF can have up to ten times higher particle emissions, based on the particle mass, than gasoline engines without GPF (Maricq et al., SAE 1999-01-01530). In addition, there are significantly fewer primary particles in the case of gasoline, engines and the secondary particles (agglomerates) are significantly smaller than in diesel engines. Emissions from gasoline engines range from particle sizes of less than 200 nm (Hall et al., SAE 1999-01-3530) to 400 nm (Mathis et al., Atmospheric Environment 38 4347) with a maximum in the range of around 60 nm to 80 nm. For this reason, the nanoparticles in the case of GPF must mainly be filtered by diffusion separation. For particles smaller than 300 nm, separation by diffusion (Brownian molecular motion) and electrostatic forces becomes more and more important with decreasing size (Hinds, W.: Aerosol technology: Properties and behavior and measurement of airborne particles. Wiley, 2nd edition 1999).

Due to their low particle relaxation time, small particles follow flowlines with almost no inertia. A random "trembling movement" is superimposed on this even, convection-driven movement. Following this theory, the largest possible flowed-around surfaces should be provided for a good filtration effect of the GPF. The powder should therefore have a high proportion of fines, since with the same total volume of oxide, small particles offer significantly larger surfaces. At the same time, however, the pressure loss must only increase insignificantly. This requires a loose crosslinking of the powder. The powder should advantageously be fixed to the carrier without prior or subsequent treatment. For a powder suitable for producing the filters according to the invention, an optimization between the largest possible surface area of the powder used, the crosslinking, and the adhesive strength is advantageous.

Various catalytic functions may also be combined with one another. The three-way catalysts mentioned above may, for example, be equipped with a nitrogen oxide storage functionality (TWNSC). As stated above, these catalysts consist of materials that, under stoichiometric exhaust gas conditions, impart to the catalyst the function of a three-way catalyst, and that have a function for the storage of nitrogen oxides under lean exhaust-gas conditions. These stored nitrogen oxides are regenerated during brief rich operating phases in order to restore the storage capability. The manufacturing of a corresponding TWNSC preferably takes place via the assembly of materials that are used for the construction of a three-way catalyst and a nitrogen oxide storage catalyst. A particularly preferred embodiment of such a catalyst is described in WO2010097146A1 or WO2015143191A1, for example. However, during the regeneration, an air/fuel mixture is preferably maintained which corresponds to a $\lambda$ of 0.8 to 1. This value lies particularly preferably between 0.85 and 0.99, and very particularly preferably between 0.95 and 0.99.

In the context of the invention, the feature of the absence of a contiguous layer on the walls of the filter is to be understood to mean that there is at least no completely continuous layer of powder on the input surfaces of the filter (FIG. 1). Powder coating of the filter is advantageously stopped when this contiguous layer is just beginning to form. It is also more preferable to prevent the powder from forming hillocks. Particularly advantageous is the deposition of an amount of powder that fills the gas-permeable pores just up to the input surface. The amount of powder that can thus be deposited depends on the type of powder and the volume of the available pores and can be determined by the person skilled in the art in preliminary experiments under the given boundary conditions.

By means of the filter according to the invention, it is possible to obtain a high filtration efficiency, in particular for small-particulate soots, such as those emitted from spark-ignition engines. In this case, the exhaust-gas back pressure does not increase unduly. The filters, provided they are catalytically active, show excellent catalytic activity. The exhaust-gas back pressure and the filtration efficiency can be specifically adapted to customer requirements. A correspondingly produced wall-flow filter is as yet not known from the prior art.

EXAMPLES

Cordierite wall-flow filters with a diameter of 15.8 cm and a length of 14.7 cm were used to produce the VGPF, GPF1, and GPF2 particulate filters described in the examples and comparative examples. The wall-flow filters had a cell density of 31 cells per square centimeter at a wall thickness of 0.203 mm. The average q3 pore size (d50) of the filters was 18 µm, with the porosity of the filters being about 50%.

An air-powder aerosol composed of a dry aluminum oxide with a d10 value of the q3 particle size of 0.8 µm, a d50 value of the q3 particle size of 2.9 µm, and a d90 value of the q3 particle size of 6.9 µm was used to coat the filters according to the invention. This corresponds to a ratio of the average particle size of the powder used to the average pore size of the filter of 0.16 and a ratio of d10 to d50 of 28%.

As comparative example VGPF, an untreated filter as described above was used.

Example 1

GPF1: The open pores of a filter were coated with 6 g/l of the dry aluminum oxide, based on the total filter volume.

Example 2

GPF2: The open pores of a filter were coated with 11.7 g/l of the dry aluminum oxide, based on the total filter volume.

The particulate filters GPF1 and GPF2 according to the invention were examined in comparison with the conventional VGPF. After coating, the particulate filters were measured for their back pressure, after which filtration measurement was then carried out on the highly dynamic engine test bench. The increase in back pressure of the filters according to the invention, measured on a back-pressure test stand (Superflow ProBench SF1020) at room temperature with an air throughput of 600 m$^3$/h, is shown in FIG. 2.

The VGPF, GPF1, and GPF2 filters described were investigated for their fresh filtration efficiency on the engine test bench in the real exhaust gas of an engine operating with an on average stoichiometric air/fuel mixture. A globally standardized test procedure for determining exhaust emissions, or WLTP (Worldwide harmonized Light vehicles Test Procedure) for short, was used here. The driving cycle used was WLTC Class 3. The respective filters were installed downstream of a conventional three-way catalyst. This three-way catalyst was the same one for all filters measured. Each filter was subjected to a WLTP. In order to be able to detect particulate emissions during testing, the particle counters were installed upstream of the three-way catalytic converter and downstream of the particulate filter. FIG. 3 shows the results of the filtration efficiency measurement in the WLTP.

FIG. 3 shows the results of the filtration efficiency measurement. Depending on the amount of powder applied, an improvement in the filtration efficiency of up to 10% is to be already observed in the first WLTP cycle with a slight back pressure increase (FIG. 2).

The measured data demonstrate that the selective coating of the open pores of a conventional ceramic wall-flow filter leads to a significant improvement in filtration efficiency with only slightly increased back pressure.

The invention claimed is:

1. A wall-flow filter for the reduction of harmful substances in the exhaust gas of an internal combustion engine, wherein a dry, non-catalytically coated filter substrate is selectively impinged on an input surface of the filter substrate with a dry powder-gas aerosol, which has at least a high-melting compound, in such a way that powder of the dry powder-gas aerosol is deposited in pores in walls of the filter substrate and fills the pores up to the input surface of the filter substrate, wherein no continuous layer forms on the walls of the filter substrate, and an amount of the powder remaining in the wall-flow filter is below 50 g/l and a powder coating has an increasing concentration gradient over a length of the wall-flow filter from an inlet side to an outlet side of the wall-flow filter.

2. The wall-flow filter according to claim 1, characterized in that the powder coating has an increasing concentration gradient over the length of the wall-flow filter from the inlet side to the outlet side, which is such that in an area near the inlet side and in an area in the middle of the wall-flow filter, less than 40% of a wall surface of an input channel is respectively coated with powder, while in an area near the outlet side, more than 40% of the wall surface of the input channel is coated with powder.

3. The wall-flow filter according to claim 1, characterized in that the filter substrate has square input channels, and wherein the powder coating in the vicinity of the corners of the input channels is thicker than a corresponding center of the input surface of the input channels.

4. The wall-flow filter according to claim 1, characterized in that the aerosol is a mixture of air and a high-melting metal oxide, metal sulfate, metal phosphate, metal carbonate or metal hydroxide powder, or mixtures thereof.

5. The wall-flow filter according to claim 4, characterized in that the high-melting powder has an outer surface of at least 5 m$^2$ per liter of filter substrate volume.

6. The wall-flow filter according to claim 1, characterized in that
   a) a d90 value of a volume-related q3 particle size distribution of the powder used is less than or equal to 60% of the average volume-related q3 pore size (d50) of the filter substrate used,
   b) an average volume-related q3 particle size of the powder (d50) is 5% to 30% of the average volume-related q3 pore size (d50) of the filter substrate used, and
   c) a d10 value of the volume-related q3 particle size distribution of the powder is at least 20% to 60% of the average volume-related q3 particle size (d50) of the powder used, and
   d) a d10 value of the number-related q0 particle size distribution of the powder used is greater than 0.05 µm.

7. The wall-flow filter according to claim 1, characterized in that the powder is catalytically active with regard to reducing the harmful substances in the exhaust gas of an internal combustion engine.

8. The wall-flow filter according to claim 1, characterized in that said wall-flow filter has an increase in filtration efficiency of at least 5% with a relative increase in the exhaust-gas back pressure of at most 40% compared to a fresh wall-flow filter not treated with powder.

9. A method for producing the wall-flow filter according to claim 1, characterized in that a carrier gas is charged with the powder and sucked into the filter substrate.

10. The method for producing the wall-flow filter according to claim 9, characterized in that the aerosol is sucked through the filter substrate at a rate of 5 m/s to 50 m/s.

11. A method of reducing harmful exhaust gases of an internal combustion engine, comprising:
- passing exhaust gases of the internal combustion engine through the wall-flow filter according to claim 1 in order to reduce harmful exhaust gases generated by the internal combustion engine.

12. The method according to claim 11, characterized in that the wall-flow filter is used in an exhaust system together with one or more catalytically active aggregates selected from the group consisting of a nitrogen oxide storage catalyst, an SCR catalyst, a three-way catalyst, and a diesel oxidation catalyst.

\* \* \* \* \*